(12) United States Patent
Payne

(10) Patent No.: US 7,200,878 B2
(45) Date of Patent: Apr. 10, 2007

(54) PORTABLE TOILET

(76) Inventor: Jessica Payne, 511 W. 151st St., Apt. D1, New York, NY (US) 10031

( * ) Notice: Subject to any disclaimer, the term of this patent is extended or adjusted under 35 U.S.C. 154(b) by 272 days.

(21) Appl. No.: 10/920,773

(22) Filed: Aug. 18, 2004

(65) Prior Publication Data

US 2006/0037131 A1    Feb. 23, 2006

(51) Int. Cl.
*A47K 11/04* (2006.01)
(52) U.S. Cl. ............................................. 4/478; 4/484
(58) Field of Classification Search .................. 4/476, 4/478, 479, 483, 484
See application file for complete search history.

(56) References Cited

U.S. PATENT DOCUMENTS 405,725 A * 6/1889 Truesdell ................... 4/483 X
3,258,291 A * 6/1966 Zacharie .................... 4/483 X
6,718,565 B1 * 4/2004 Cruz ............................. 4/476

\* cited by examiner

*Primary Examiner*—Robert M. Fetsuga
(74) *Attorney, Agent, or Firm*—Steven Horowitz

(57) ABSTRACT

A collapsible portable toilet includes a chair frame including a built-in foldable seat with a hole, a seat back, four legs and two front wheels, a disposable absorbent fragrant flexible refuse bag extending through the hole in the seat and draped around an outer perimeter of the seat, the refuse bag attached to an underside of the seat, a roof support frame comprising parallel telescoping vertical rods extending from a rear of the seat and attached to the seat back, a roof comprising parallel rods connected to a top of the roof support frame at a pivot point, the roof rotatable at the pivot point to and from a stored position. A bag removably attached to a top of the roof having curtain material to be draped around the roof support frame and roof for privacy, the curtain material having reflectors on an outside and in inside pockets.

8 Claims, 5 Drawing Sheets

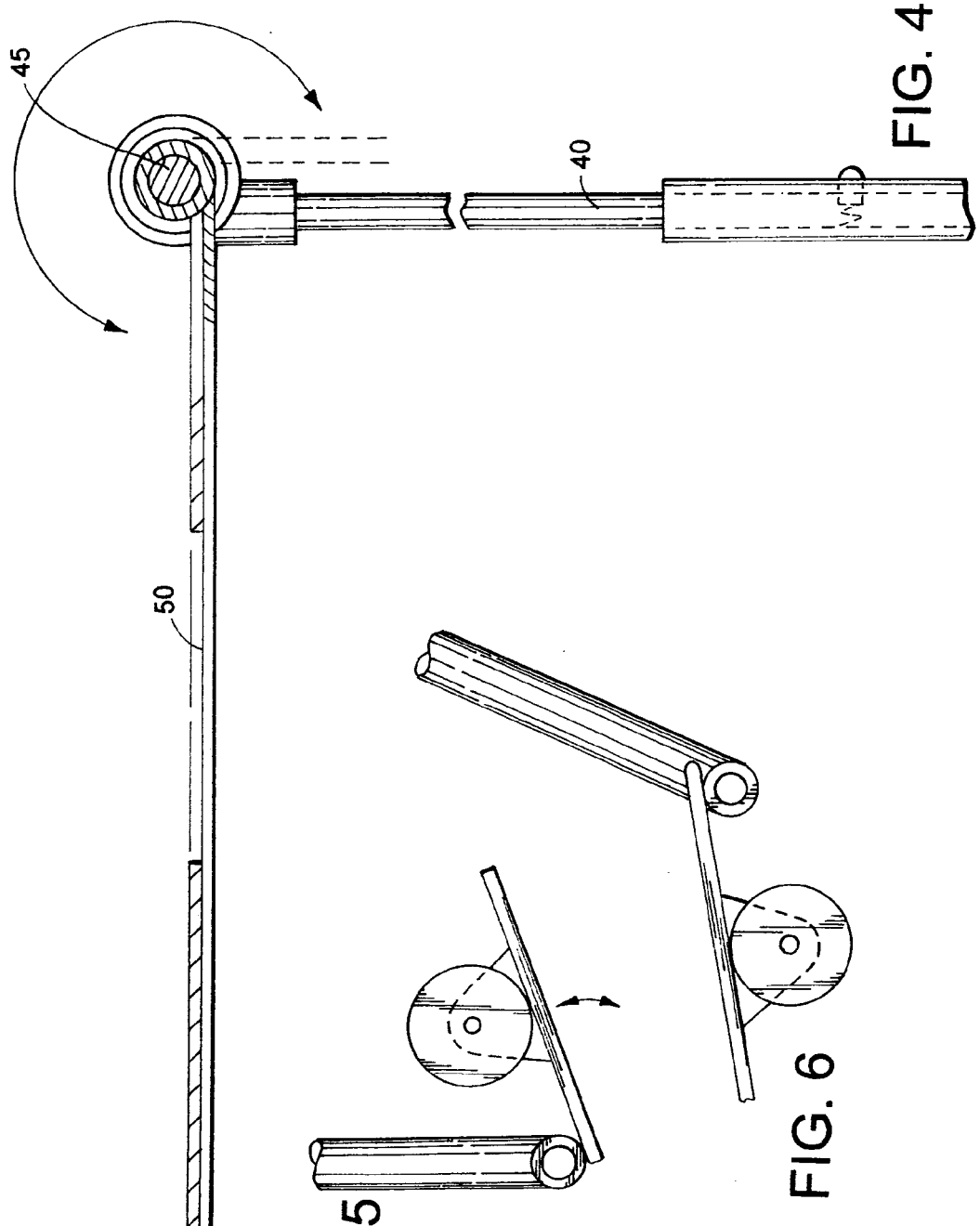

PORTABLE TOILET

FIELD OF THE INVENTION

The field of this invention is toilets, and more particularly, portable toilets.

BACKGROUND OF THE INVENTION AND DISCUSSION OF THE PRIOR ART

It is well known everyone needs to relieve themselves of liquid and solid waste in a lavatory frequently and regularly. Often, however, people are in locations that are inaccessible to an immediate use of such facilities. For example, a person may be indoors but there may be a line to go to the restroom. More commonly, a person may be outdoors and no lavatory facility is conveniently available. Outdoor locations where such situations are most common include but are not limited to camping trips, hiking, parades, amusement parks, outdoor recreational activities, long car rides, outdoor fairs or anything else. Even if such facilities are available the lavatory may be too far away. Even if the lavatory is available and not too far away, there may be a long line to use it. Thus there is an obvious need to have lavatory facilities that are conveniently located.

For some individuals such as pregnant women, individuals with bladder weaknesses and other individual with particular medical conditions the problem of not having a nearby lavatory when needed is not merely an issue of convenience and comfort but rather an acute medical problem. Conversely, such individuals, by virtue of their expectation of having to avoid placing themselves in such a predicament may be forced to limit their own mobility. Since such individuals may have busy lifestyles they may not appreciate having to condition their activities on the constant availability of bathroom facilities.

Attempted solutions to the above problem include making available cubicle-type lavatories outdoors near parks, parades, fairs and other public activities so that a member of the public can use said facilities. Such a solution would not alleviate the problem of a person in a long car ride. Moreover, this solution would not be satisfactory for individuals with medically-based need to always have a lavatory conveniently available wherever they may be, and regardless of their lifestyle. In addition, this attempted solution would require prior placement of large amounts of these bulky cubicles in so many different places that it would be expensive and unsightly. Another problem with these cubicle-style lavatories is that they require lighting inside and this requires them to be electrically wired to a nearby electrical power source.

Prior art outdoor lavatory facilities are also unclean. Furthermore, since they are designed for the public, they often generate long lines, which for some people defeats the purpose of having such a lavatory available. A further drawback associated with known prior art ad hoc toilets is that they either make noise from flushing or would require a lot of expense for insulation to block such noise. There are situations when such noise is a drawback. For example, when camping outdoors near other individuals the flushing noise has numerous disadvantages, such as unpleasantness, a tendency to wake up fellow campers, the possibility and danger of attracting animals, etc. Other such situations can readily be envisioned. There is a need for a portable toilet that does not make any noise from its use other than the natural minimal sounds of a person using the facilities.

Toilets to address the needs delineated above need to be designed for use anywhere, including, and possibly especially, in the dark. This is essential since the inherent need for privacy associated with this activity itself causes the absence of light. That is, the need for privacy requires enclosing oneself from outside sources of view and this necessarily blocks off outside light sources as well. Prior art toilets other than those in homes and offices, for example the bulky cubicle-style lavatories that are common in urban settings such as parades, generally include electrical lighting built in. Such built-in lighting is expensive and complicated.

In general the cubicle-style lavatories placed near parks and other urban settings are not realistic for camping settings or hiking. Furthermore, these lavatories are in any even not portable and hence cannot address the needs of those who want a guaranteed access to a toilet, Such lavatories are not inexpensive to manufacture and are expensive to maintain. Moreover, as noted, they are typically unclean. Thus there is also a need for a portable toilet ideal for use even in darkness that is easy to manufacture and maintain, that can be wheeled around and that is quiet and clean. The present invention meets these criteria and provides many other advantages as well.

SUMMARY OF THE PRESENT INVENTION

A collapsible portable toilet includes a chair frame including a built-in foldable seat with a hole, a seat back, four legs and two front wheels, a disposable absorbent fragrant flexible refuse bag extending through the hole in the seat and draped around an outer perimeter of the seat, the refuse bag attached to an underside of the seat, a roof support frame comprising parallel telescoping vertical rods extending from a rear of the seat and attached to the seat back, a roof comprising parallel rods connected to a top of the roof support frame at a pivot point, the roof rotatable at the pivot point to and from a stored position. A bag removably attached to a top of the roof having curtain material to be draped around the roof support frame and roof for privacy, the curtain material having reflectors on an outside and in inside pockets.

IMPORTANT OBJECTS AND ADVANTAGES

The following important objects and advantages of the present invention are:

(1) to provide a portable toilet;
(2) to provide a portable toilet that makes a lavatory available to anyone anywhere;
(3) to provide a portable toilet that is lightweight;
(4) to provide a portable toilet that is easy to transport anywhere;
(5) to provide a portable toilet that is appropriate for camping trips, amusement parks, parades, public fairs, outdoor activities;
(6) to provide a portable toilet that can be used indoors;
(7) to provide a portable toilet that is private;
(8) to provide a portable toilet that furnishes its own light source so that it can be used safely in the dark;
(9) to provide a clean and hygienic portable toilet;
(10) to provide a portable toilet that can be folded up and stored;
(11) to provide a portable toilet that can be rolled;
(12) to provide a portable toilet that is fragrant;
(13) to provide a portable toilet with a disposable refuse bag;
(14) to provide a portable toilet that is safe;

(15) to provide a portable toilet that can be used by persons of varying heights, including children and adults;

(16) to provide a portable toilet that avoids the necessity of having a flushing mechanism;

(17) to provide a portable toilet that makes no sound other than sounds made by the actual use of the toilet by a user;

(18) to provide a portable toilet that is durable;

(19) to provide a portable toilet that is secure;

(20) to provide a toilet that solves the medical needs of individuals who must have access to a toilet but wish to maintain a busy lifestyle; and

(21) to provide such a portable toilet that is simple and inexpensive to manufacture.

BRIEF DESCRIPTION OF THE DRAWINGS

FIG. 4 is a sectional view of the portable toilet of the present invention taken along line 4—4 of FIG. 1;

FIG. 5 is a fragmentary side view of the foot of the portable toilet of the present invention in a "use" position with the wheels up;

FIG. 6 is a fragmentary side view of the foot of the portable toilet of the present invention in a "stored" position with the wheels on the ground;

DETAILED DESCRIPTION OF THE PREFERRED EMBODIMENT

Figure 1:
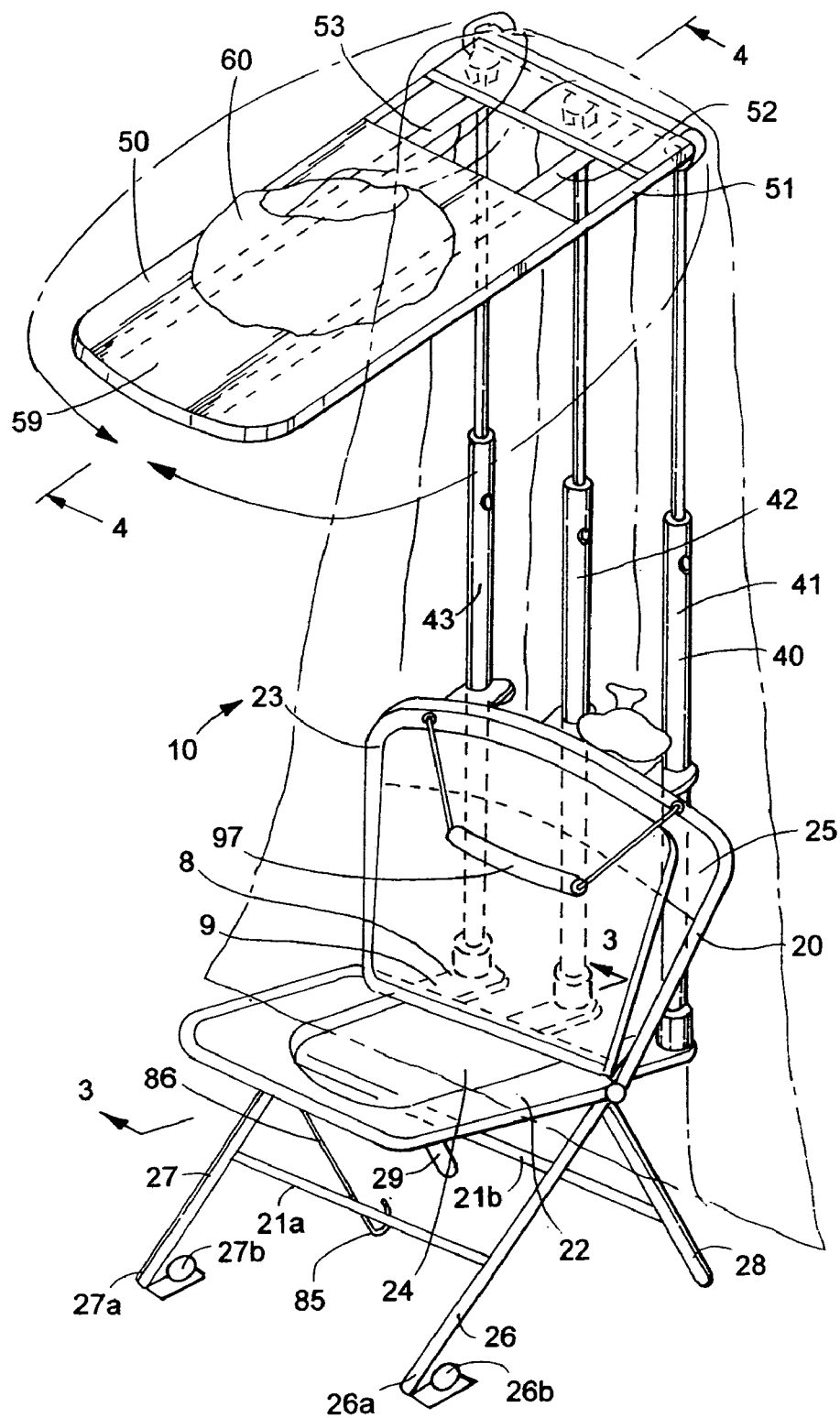
FIG. 1 is a perspective view of the portable toilet of the present invention in erected position.

The apparatus of the present invention will now be illustrated by reference to the accompanying drawings. The portable toilet of the present invention has been assigned reference numeral 10 Other elements have been assigned the reference numerals referred to below.

As seen from FIGS. 1–8, portable toilet 10 includes chair frame 20. Although by no means is the present invention limited to any particular size, certain preferred or typical dimensions are provided in this patent application for the elements of the portable toilet. For example, the chair frame 20 of the present invention is typically approximately 35 inches long and approximately 18 inches wide.

Chair frame 20 includes seat 22 having a hole 24. Preferably, as seen from FIGS. 1 and 3, seat 22 is simply a substantially flat piece of the frame 20 having a hole 24 in it. Alternatively, seat 22 can include a movable annular seat (not shown) separable from the remainder of seat 22.

In either case, hole 24 is typically circular. For adults, the hole 24 has a diameter of approximately 15 inches. Other sizes would be tailored to special types of individuals, such as smaller dimensions for children.

Chair frame 20 also includes metal seat back 25. Chair frame 20 also includes four legs, including a left front leg 26 having at a low end 26a a pivoting left rolling wheel 26b that can be raised off a surface 99 when the toilet 10 is in use, a right front leg 27 having at a low end 27a a pivoting right rolling wheel 27b that can be raised off the surface when the toilet 10 is in use, a left rear leg 28, and a right rear leg 29, and chair frame 20 also includes for stability and durability a front crossbar 21a and a rear crossbar 21b.

When using portable toilet 10, it is undesirable to roll away. Hence, as seen in FIG. 5, rolling wheels 26b, 27b are folded up. In contrast, as seen in FIG. 6, when toilet 10 is being wheeled or is in a stored or folded position, rolling wheels 26b, 27b are down and in contact with the ground or other surface.

The seat 22 is foldable so that it meets seat back 25 for when the toilet 10 is to placed into storage position for hanging by its handle 97 or is to be transported on its wheels 26b, 27b.

Seat cover 23 covers seat 22.

A disposable absorbent fragrant flexible refuse bag 30 is placed by the user so that it extends through the hole 24 in the seat 22 and refuse bag 30 is easily draped around an outer perimeter of the seat 22. Refuse bag 30 is attached to hooks on an underside of the seat 22 or by any other suitable attachment means. Refuse bag 30 also has many artfully positioned attachment holes lined with a durable material to fit on a series of peg hooks projecting from the front and sides of the seat 22. For example, each side of the seat 22 may have four peg hooks and a corresponding number of attachment holes in the refuse bag 30 at appropriate points of the refuse bag 30. Refuse bag 30 is typically made of plastic and is lined with absorbent layers of material, for example the kind of material used in diapers or feminine hygiene products. Refuse bag 30 also has a drawstring that is located below the attachment holes in said refuse bag 30.

A wall 40 or roof support frame 40 comprises a plurality of substantially parallel telescoping vertical rods, for example vertical rods 41, 42, 43, extending from and attached to the rear 22a of seat 22 and as well as being attached to seat back 25. Preferably, the attachment between each vertical rod 41, 42, 43 of roof support frame 40 to rear 22a of seat 22 and to seat back 25 is via clamps 9 and brackets 8, or it may be by any other well known secure and durable attachment means capable of holding up roof 50. Typically, the clamps in the attachment means are plastic to maintain the lightweight nature of the portable toilet. Vertical rods 41, 42, 43 are preferably hollow and telescope at two different points through well known means. For example, a nipple normal to the length of the rod and located at or near one end of a segment of one of the rods 41, 42, 43 is sized to enter a hole in the rod at the beginning of the adjacent segment of that one of the rods 41, 42, 43. In other words, each of vertical rods 41, 42, 43 have preferably three segments and typically the first segment telescopes into the second segment and the second segment telescopes into the third segment.

Roof 50 is comprised of a plurality of substantially parallel roof frame rods 51, 52, 53 connected to a top of the roof support frame 40 at a pivot point 45. The roof 50 is rotatable at the pivot point from a stored position in which the roof 50 is substantially parallel to the roof support frame 40 to a lockable position substantially normal (perpendicular) to the roof support frame for when the toilet is in use. Roof frame rods 51, 52, 53 are typically metal but any material durable and relatively lightweight is sufficient.

Roof 50 is covered by a canvas 59 that covers the plurality of roof frame rods 51, 52, 53. Preferably, canvas 59 is double-layered and can be opened by a simple zipper in a middle area of canvas 59.

As best seen in FIG. 4, pivot point 45 represents a linear junction between the roof support frame 40 and the roof 50.

Three metal hinges along pivot point 45 allow roof 50 to rotate from its stored position to its operative position when the toilet 10 is in use.

A bag 60 is removably attached to the top 55 of the roof 50, for example by snaps. Typically, bag 60 is attached to canvas 59. Inside the bag 60 is a lightweight opaque curtain material 70 that is being stored until it is needed to help enclose portable toilet 10. The curtain material 70, when unfurled, is capable of being draped around the roof support frame and around a perimeter of the roof while leaving its ends unattached ends so create an opening once a person moves one end away from the other end. In order to make the manufacturing process easier, bag 60 also has an extra curtain material 73 immediately attached to the inside of the bag 60, which can be thought of as separate from curtain material 70, and extra curtain material 73 serves to allow curtain material 70 attached to extra curtain material 73 to be unfurled without being limited by the bag 60. Extra curtain material 73, which may be approximately one foot long, is first sewn or otherwise connected to the inside of bag 60 and only then the curtain material 70 is sewn or otherwise connected to extra curtain material 73. Otherwise, it would be possibly awkward and cumbersome to sew the entire curtain material 70 immediately to bag 60. Curtain material 70 is preferably pleated whereas extra curtain material 73 need not be.

Figure 7:
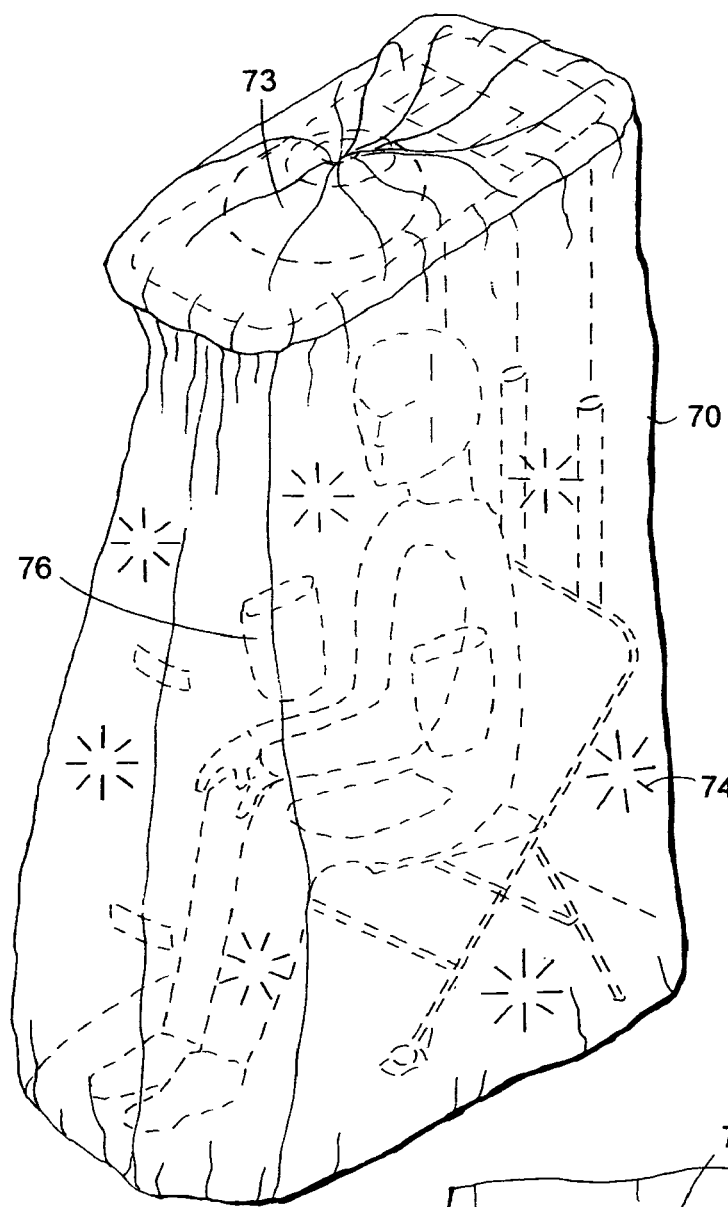
FIG. 7 is a perspective view of the closed curtain material draped around the portable toilet seat of the present invention with a person inside and showing illuminated fabric.
Figure 8:
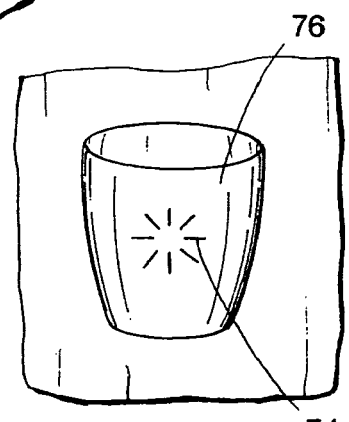
FIG. 8 is a fragmentary view of the inside of the curtain material showing reflective material on pocket.

As best seen from FIGS. 7–8, curtain material 70 has a plurality of inside pockets 76, an outer surface of each inside pockets including luminescent reflective material 74, a portion of an outer surface of the curtain material having luminescent reflective material 74 attached thereto.

As a result of the luminescent material in the inside pockets of the curtain material 70 and on portions of the outside surface of the curtain material 70, the user can make of the toilet 10 in the dark since the luminescent material glows in the dark. Furthermore the pockets can be used to hold wipes, toilet paper and other bathroom accessories.

An additional feature of portable toilet 10 is provided to provide additional stability for when the toilet 10 is in a folded or stored position. Hook 85 extends from an elongated member 86, the elongated member 86 connected to the seat 22 so that hook 85 can be attached to the front crossbar 21a in order to securely maintain the portable toilet 10 prior to the roof 50 being flipped over to become normal to roof support frame 40 from its original folded position where roof 50 is parallel to roof support frame 40. Without hook 85 being connected to front crossbar 21a, seat 22 would fold up automatically when roof 50 is parallel to roof support frame 40 in folded position.

Figure 2:
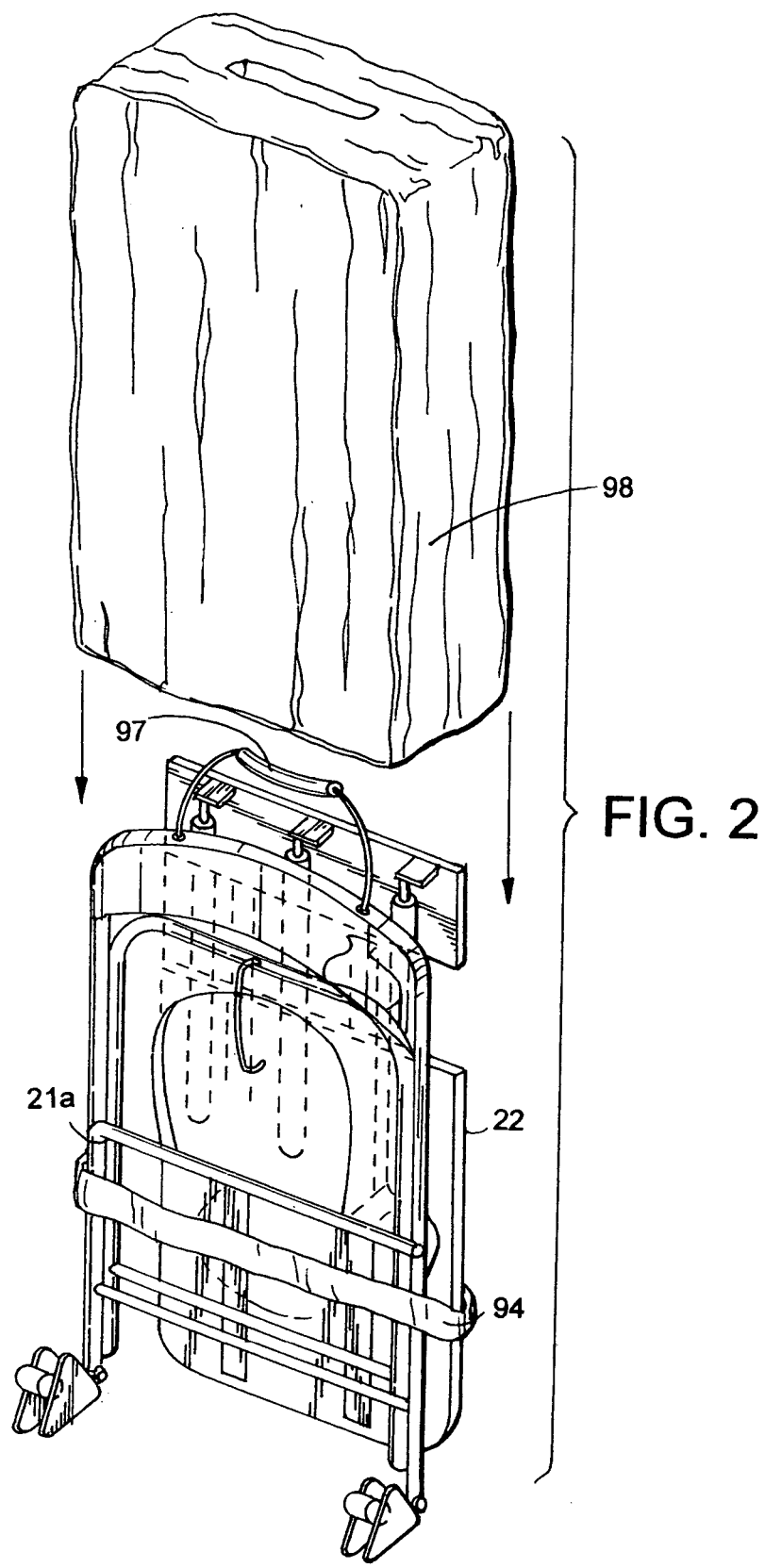
FIG. 2 is a perspective view thereof in a stored position.
Figure 3:
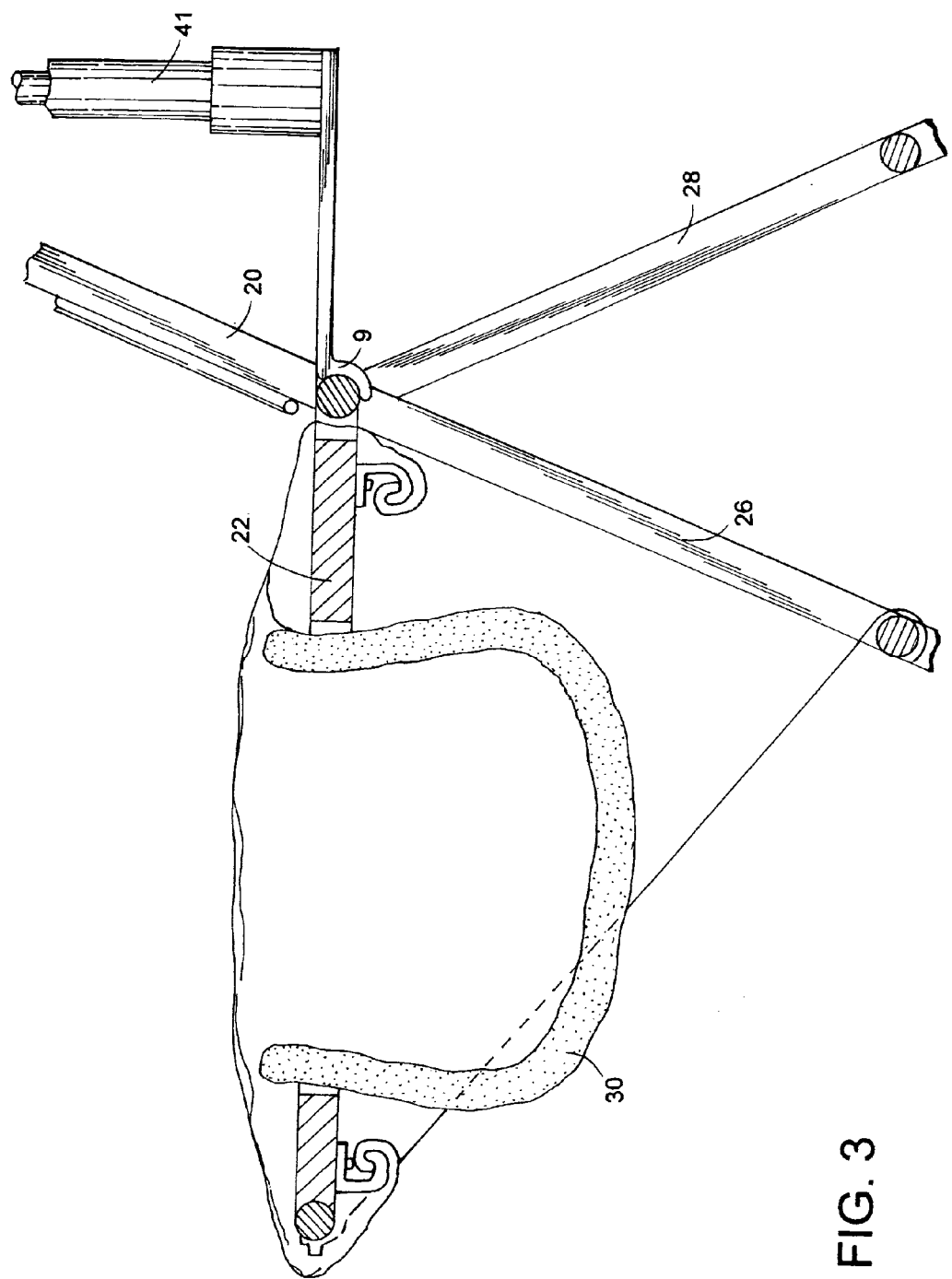
FIG. 3 is a sectional view of the portable toilet of the present invention taken along line 3—3 of FIG. 1.

In folded position, sash 94 can be used to secure toilet seat 10. Furthermore, as seen in FIG. 2, when folded and after being secured by sash 94, cover 98 is preferably placed over toilet 10 so as to encase the entire portable toilet 10 for use when wheeling the toilet 10 around on its wheels. Even when covered, handle 97 sticks out of cover 98.

It is to be understood that while the apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A collapsible portable toilet for day or nighttime use, comprising:

a chair frame including a seat having a hole, a seat back, a left front leg having at a low end a pivoting left rolling wheel that can be raised off a surface when the toilet is in use, a right front leg having at a low end a pivoting right rolling wheel that can be raised off a surface when the toilet is in use, a left rear leg, a right rear leg, a front crossbar, a rear crossbar, the seat foldable to the seat back for a storage position, a disposable absorbent fragrant flexible refuse bag extending through the hole in the seat and draped around an outer perimeter of the seat, the refuse bag attached to an underside of the seat, a roof support frame comprising a plurality of substantially parallel telescoping vertical rods extending from a rear of the seat and attached to the seat back, a roof comprising a plurality of substantially parallel rods connected to a top of the roof support frame at a pivot point, the roof rotatable at the pivot point from a stored position substantially parallel to the roof support frame to a lockable position substantially normal to the roof support frame for when the toilet is in use, a bag removably attached to a top of the roof, lightweight opaque curtain material stored inside the bag, the curtain material, when unfurled capable of being draped around the roof support frame and around a perimeter of the roof while leaving unattached ends for an opening, the bag also having an extra curtain material to permit the curtain material to be unfurled without being limited by the bag, the curtain material having a plurality of inside pockets, an outer surface of each inside pockets including luminescent reflective material, a portion of an outer surface of the curtain material having luminescent reflective material attached thereto.

2. The portable toilet of claim 1, wherein a handle is attached to the seat back for hanging and pulling the portable toilet while the portable toilet is in a stored position.

3. The portable toilet of claim 1, including a cover for the portable toilet that can hold the portable toilet when the portable toilet is in stored position.

4. The portable toilet of claim 1, including a belt that secures the portable toilet seat while the portable toilet seat is in a stored position.

5. The portable toilet of claim 1, wherein a seat cover covers the seat.

6. The portable toilet of claim 1, wherein the bag is attached to a canvas at a top of the roof.

7. The portable toilet of claim 1, including a hook extending from an elongated member, the elongated member connected to the seat, so that the hook can be attached to the front crossbar in order to securely maintain the portable toilet in a folded position.

8. The portable toilet of claim 1, wherein the bag is attached to a canvas at a top of the roof and wherein the portable toilet includes a hook extending from an elongated member, the elongated member connected to the seat, so that the hook can be attached to the front crossbar in order to securely maintain the portable toilet in a folded position.

* * * * *